May 27, 1958    J. W. CRAWFORD    2,836,426
TOOL HOLDER
Filed March 15, 1956    2 Sheets-Sheet 1

INVENTOR.
John W. Crawford.
BY
Harness, Dickey & Pierce
ATTORNEYS.

May 27, 1958   J. W. CRAWFORD   2,836,426
TOOL HOLDER
Filed March 15, 1956   2 Sheets-Sheet 2

INVENTOR.
John W. Crawford.
BY
Harness, Dickey & Pierce
ATTORNEYS.

United States Patent Office 2,836,426
Patented May 27, 1958

2,836,426

TOOL HOLDER

John W. Crawford, Flint, Mich.

Application March 15, 1956, Serial No. 571,787

17 Claims. (Cl. 279—76)

My invention relates to tool or cutter holders and in particular to a clamp or locking device for use in such holders.

It is a principal object of my invention to provide a tool holder locking device that can be inexpensively manufactured and which will function in an improved manner.

Another object of my invention is to provide a tool holder lock device in which the parts that are subject to wear are very inexpensive and may be easily replaced.

A further object of my invention is to provide a tool holder clamping device of such a shape that it may be used in the cavity now provided for tool locks in many conventional machines and tool holders.

Another object is to provide a tool holder clamping device which may be adapted to absorb shock on the tool.

A further object is to provide a locking device for tool holders in which the lock element cannot bind in an inoperative position.

Another object is to provide a means for locking a cylindrical type of spike tool in its proper position so that the desired cutting angle is maintained.

In preferred form, my invention contemplates the use of a cylindrical housing having a flat surface formed on one side, which surface is adapted to be placed in engagement with or next to a tool or cutter to be locked in place. Opening out of this surface is an inclined passage containing a ball which is wedged tightly against the tool or cutter by means of a cone-point socket screw threaded in the housing. The action of the ball is such as to also drive a corner of said surface tightly against the tool to give a point plus line support to it and to tend to longitudinally force the tool against the bottom or resting pad in the tool holder.

Additional objects of the invention as well as features and advantages thereof will be pointed out in connection with the description of the structure shown in the accompanying drawings in which.

Figure 1:
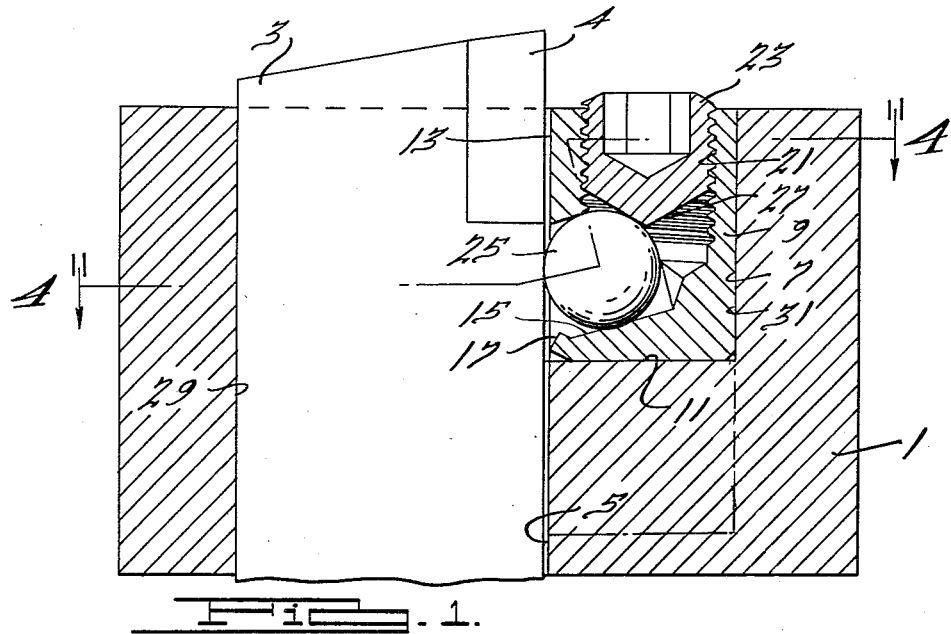
Figure 1 is a cross section through a conventional tool holder containing a locking device embodying the invention and showing the locking element in an operative position.
Figure 4:
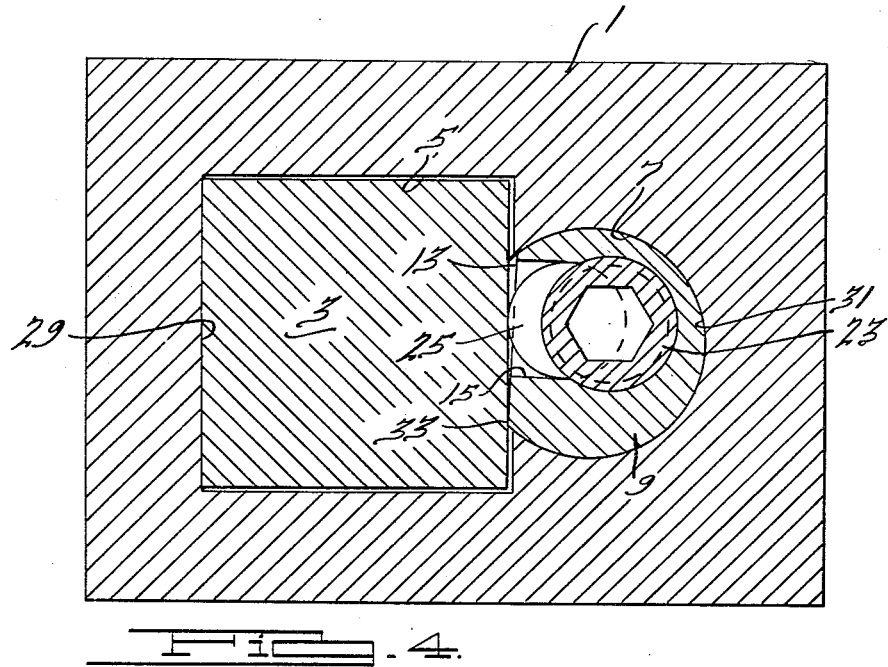
Fig. 4 is a cross section taken along the line 4—4 of Fig. 1.
Figure 5:
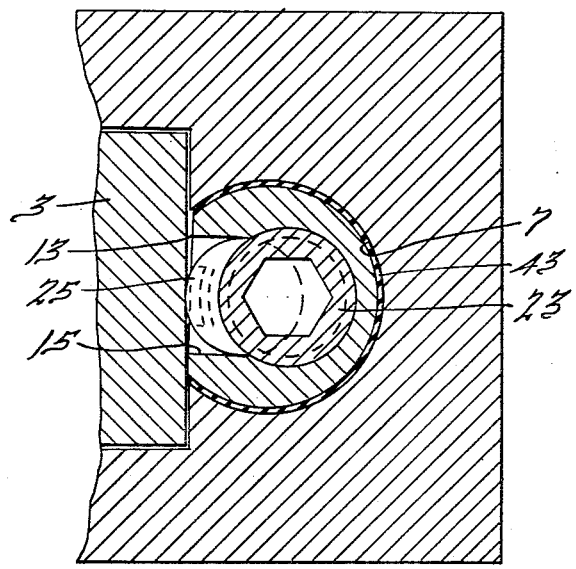
Fig. 5 is a section similar to that of Fig. 4 but showing a slightly different arrangement of parts in the clamping device.

In Figs. 1, 4, and 5 the tool holder 1 and the spike tool 3 with carbide tip 4, which fits in the rectangular opening 5, are illustrative of the various types of tools or cutters that may be held firmly in place by means of the locking device of this invention. As those in this field will understand, my invention can be used in holding inserted blades in milling cutters, tools in boring tool holders, punches in plates for use on punch presses, tools used in broaching machines, and so on. Further, the tool can be of various shapes such as square, rectangular, cylindrical, etc. Preferably, however the tool presents a flat surface to the locking device of this invention though it will become apparent that locking action can be obtained even if this is not the case. Reference may be had to an article on broaching at 59 Machinery 153 (August, 1953) and particularly to Fig. 5 thereof for an illustration of an important application of the invention, embodiments of which can be substituted for the devices E shown in said figure.

The tool holder 1 has a cylindrical cavity 7 formed in it which intersects the aperture 5 for the tool 3. The cavity 7 is standard and found on many tool holders at the present time (e. g. see the aforementioned article). In accordance with my invention I insert a housing 9 in the cavity, the housing being of the same size and shape as the cavity so that it readily slides into position in it. The housing 9 rests on the bottom surface 11 of the cavity 7 and is wedged firmly in position by the locking element to be presently described. It will be apparent that if the tool holder is disposed in some position other than the upright position shown so that the housing 9 cannot fit simply in the cavity and stay there by gravity, a lock screw or the like can be employed to prevent the housing 9 from dropping out when the locking element is in an inoperative position.

Figure 3:
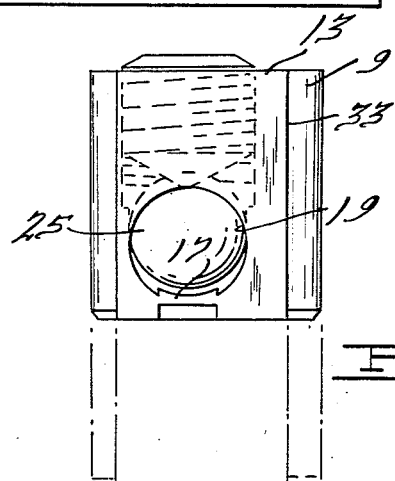
Fig. 3 is a side elevation of the locking device taken from the left of Fig. 2 and with the ball removed and showing the screw threaded passage and the ball passage having axes lying in the same plane but offset in a direction opposite to the direction of screw tightening from the midplane of the body.
Figure 3:
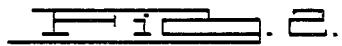

The housing 9 has a flat surface 13 corresponding to the line of intersection between the cavities 5 and 7. Opening out of the surface 13 is an upwardly inclined passage 15 which is drilled into the housing 9, the axis of the passage 15 being shown as lying in a vertical plane which is perpendicular to surface 13. A lip 17 is swaged in a suitable press from surface 13 to extend upwardly from the bottom of the opening 19 formed by the passage 15 in surface 13. Intersecting the passage 15 is a passage 21 that has been drilled and tapped to provide threads which will receive a cone pointed socket screw 23, the axis of the passage 21 lying in the aforementioned vertical plane containing the axis of passage 15 as can be seen in Fig. 3. The I. D. of the threads in the passage 21 are slightly larger than the diameter of the locking ball 25 which is disposed within the housing 9 in the passages 15 and 21, the ball and passage 15 being substantially the same diameter. The lip 17 which has been swaged up from surface 13 into the passage 15 makes the smallest width of the opening 19 just slightly less than the diameter of the ball 25 so that it cannot come out of the passage 15 through the opening 19. Due, however, to the fact that the passage 15 is on an angle and to the incline of lip 17, a very large proportion of the ball can project out of the passage 15 thus enabling the locking device to be used with tools 3 that are considerably undersized. The ball 25 can travel 10 to 15 times further than conventional wedge elements now available and is fully effective to lock tools of varying thickness in place throughout this range of travel.

The ball 25 is wedged against the adjacent face of the tool 3 by the conical end 27 of the screw 23 and the angular relationship provides a pressure angle which increases the mechanical advantage so that very high locking forces can be obtained. This wedging action of the screw on the ball tends to spread the tool 3 and the housing 9 apart and forces them tightly against their respective backing surfaces 29 and 31 with the over-all result that the tool 3 is firmly clamped in place. It also tends to drive the tool against its bottom rest pad (not shown). As seen best in Figure 4, clockwise rotation of the right hand screw 23 also tends to rotate the housing 9 in the same direction and, as a result, the edge 33 of surface 13 will engage the tool 3 and act with the ball 25 to lock the tool 3 in place. By offsetting the axially coplanar passages 15 and 21 to the left as seen in Fig. 3 (i. e. opposite to the direction of operative rotation of the screw) or above the center of the housing 9 as seen in Fig. 3 the moment arm on the edge 33 is increased and the effectiveness of the joint action of the ball 25 and this edge is enhanced because their respective point and line of contact are spread a maximum distance apart.

The passage 21 is shown as offset outwardly (to the right in Fig. 1) from the center of the housing 7 with respect to the surface 13. This enables the passage 15 to be made long enough so that when screw 23 is backed off (as in Fig. 2) the ball 25 can be moved freely into the passage 15 so that it will present no rigid surface projecting beyond face 13 thus enabling the tool 3 to be completely unlocked. It also enables the screw 23 to be made a maximum diameter for a given size body thus insuring contact of the ball with the lower part of the screw cone despite rather substantial travel of the ball and also insuring that hole 21 will be large enough to allow the ball to be inserted through the top thereof into the body 9.

Figure 2:
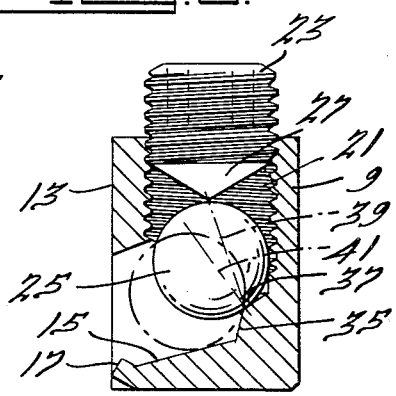
Fig. 2 is a cross section through the improved locking device of Fig. 1 taken along the axis of the passages showing the locking element in a retracted or inoperative position.

An important part of the present invention is a feature whereby the ball 25 cannot be locked in a retracted position no matter where it is in the passages 15 or 21 and no matter how the body 9 is disposed with respect to the vertical. One of the worst conditions with respect to locking of the ball in an inoperative condition will occur when the body 9 is laid on its side so that the opening 19 is on top. This can be seen by turning the drawing 90° to the right so that the right hand side of body 9 in Figure 2 is horizontal. It may be observed from Figure 2 and also from the fact that hole 21 is larger than ball 25, that the tip of cone 27 will engage the ball over center at a point between the center of the ball and surface 13. Normally it would be expected that this relationship would cause the cone to lock the ball in the fully retracted position of Figure 2. However, the bottoms 35 and 37 of passages 15 and 21, respectively, are formed and related so that such locking cannot occur. It is to be noted that the bottoms 35 and 37 are formed by standard drill bits and therefore have a conventional shape and are located on the usual angle with respect to the axes of their respective holes. However, the hole 15 is drilled relatively shallow and the hole 21 relatively deep with the result that the ball is tangent to the surface 37 when it is in its fully retracted position of Figure 2. In this position a line 39 between the point of contact with surface 37 and the point of contact with the tip 27 passes on the outer side of the center of the ball with the result that pressure of the screw on the ball will force it toward opening 19. It will not force it away from opening 19 which would be the case if the ball had a tendency to lock in the fully retracted position. As the ball moves off the surface 37 it will drop on to the side of hole 15 and it is obvious that additional pressure from the screw 23 will push it forth toward opening 19.

In order to prevent locking in the fully retracted position, the line of action 39 between the point of tangency of the ball and seat and the point of contact with the cone should, as in the case of Fig. 2, be on the side of center of the ball 25 remote from the opening 19; and in order to insure against binding due to friction or brinelling of the ball seat, I prefer that this line of action make an angle of at least 7 or 8 degrees with the radius 41 on the ball to the point of tangency with the ball seat.

This location of the line of action 39 could be obtained by having the ball seat on the side of hole 15 by drilling the hole deeper and putting it on a steeper angle, say 25 to 30 degrees. However, I prefer to put hole 15 on an angle of about 15° as shown as this gives just about the maximum projection of the body of the ball out of opening 19 and thus maximum ball travel.

Figure 5 shows a slight modification of the invention in which there is provided a layer of rubber or other shock absorbing material 43 around the body 9. This may be adhered to the body itself but preferably to the inside of the cavity 7. It will tend to absorb vibrations of the tool and thus increase its life, particularly in cases where the ball comes in contact with the carbide insert 4. If desired the housing 9 could be made of laminated or shock resistant material of a suitable type which in itself would have a certain degree of shock resistance to reduce vibration in the tool.

Figure 6:
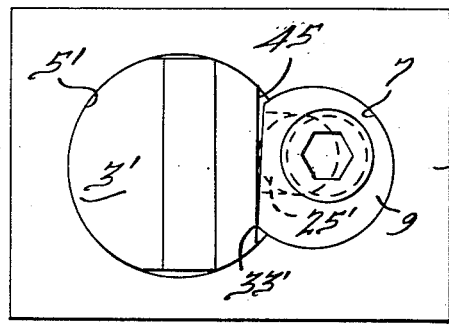
Fig. 6 is an elevation similar to sections 4—4 and 5—5, showing the invention used to lock a cylindrical spike tool.
Figure 6:
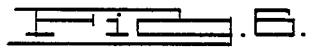

As will be seen in Fig. 6, the invention can be used with cylindrical spike tools 3'. In the use of cylindrical tools, there is naturally a tendency for them to rotate in opening 5'. However, the two place contact provided by ball 25 and edge 33 with the flat 45 on the tool 3' will hold the tool rigidly in place and prevent such rotation. It will be appreciated that the structure of the locking device shown in Fig. 6 in the tool holder 1' may be the same in all respects as those already described in detail so that further description of this application of the invention is not necessary.

Figs. 1 and 3 show in phantom lines that the length of the housing 9 (and, of course, the depth of hole 7) can be made much greater than that which is conventional. Since contact will be obtained along the entire length of edge 33, such an increase in length will have the advantage of providing additional support against tool vibration or movement in an oversize hole. This can be done without changing the location or depth of holes 15 and 21 and simply by adding more stock below the passage 15 as indicated by the phantom lines.

The ball 25 and the cone end 27 of screw 23 are the parts subject to most wear. I prefer that both be made of hardened steel of at least Rockwell "C" 60. Such a ball is a standard part and can be purchased on the open market, thus minimizing maintenance expense. The housing can be easily made from bar stock and I prefer to use a steel that can be heat treated to at least Rockwell "C" 43 so as to obtain toughness in the threads along with substantial wear resistance.

It will now be seen that the locking device of this invention is very simple and inexpensive to manufacture but due to the novel arrangement of passages 15 and 21 provides a high locking force, large range of travel of the ball out of the housing without any possibility that it will come out, and permanent instability in the unlocked condition so that there is no binding. It will also be apparent that various modifications may be made in the structure that is shown without departing from the spirit and scope of the invention. For example, it would be possible to place the housing 9 in various other positions in the tool (e. g. axis perpendicular to the axis of the tool) and to use it for various other purposes.

I claim:

1. In a tool holder having an aperture to receive a tool and a cavity opening into said aperture, a tool clamping device in said cavity comprising a body having a passage opening into said aperture, a rolling element in said passage and adapted to engage a tool in said aperture, and means in said device for forcing said ball outwardly through said passage to engage said tool, the opening of said passage into said aperture being slightly less than the diameter of the rolling element whereby said rolling element is held within said body.

2. The invention set forth in claim 1 wherein said passage is at an angle to the aperture, whereby a great portion of the rolling element can project out through said opening.

3. The invention set forth in claim 1 wherein said rolling element comprises a ball and said force applying means comprises a conically pointed screw engageable with the ball.

4. In a locking device comprising a cylindrical body having a flat side parallel to the axis of the body, a passage in the body opening out of said flat side, a rolling element in the passage, means on the body making the width of the opening of said passage into said flat surface slightly less than the diameter of the rolling element, and a screw threaded into the body on an axis parallel to the axis thereof and engageable with the rolling element to force it to project out of said flat surface.

5. The invention set forth in claim 4 wherein said rolling element comprises a ball and said means comprises an ear staked on the edge of said opening in said flat surface.

6. The invention set forth in claim 4 wherein the bottom of said passage and the bottom of said screw are related so that the line of force between the screw and the point of contact of the ball with the passage is always located on the side of center of the ball which is remote from said flat surface whereby said screw always tends to cam the ball toward said flat surface.

7. In a tool holder having an aperture to receive a tool and a cavity opening into said aperture, a tool locking device in said cavity comprising a housing having a transverse passage opening into said aperture, said housing having a longitudinal passage intersecting said transverse passage, said longitudinal passage being larger than said transverse passage and its axis being offset from the center line of said housing in a direction away from said aperture, a ball in said passages, and means in said longitudinal passage to force the ball to project out of the transverse passage and engage a tool in said aperture.

8. The invention set forth in claim 7 wherein said housing and cavity are surfaces of revolution having a common axis substantially coincident with the longitudinal axis of the housing, the axis of said transverse passage being offset from a diametral plane through the housing.

9. The invention set forth in claim 8 wherein said means to force the ball against the tool comprises a screw threaded in said longitudinal passage, the offset of said transverse passage being in a direction opposite to the direction of the rotation of the screw to apply force to the ball.

10. In a locking device, a housing, means providing a passage opening out of one side of the housing, means providing a second passage intersecting said first-mentioned passage, a ball in said passages and arranged to project out of the first-mentioned passage to engage a device to be locked, means in said second passage for engaging the ball to wedge it out of said first passage, the walls of said passages being shaped so that a line between the point of contact of the ball therewith and the point of contact of said ball wedging means with said ball always lies on the side of center of the ball which is remote from the opening of said first-mentioned passage out of said side of said housing.

11. The invention set forth in claim 10 wherein said line makes an angle of at least about 8° with a radius from the center of the ball to the point of tangency of the ball with the passage.

12. In a tool holding device, a locking element comprising a body having an edge portion, a passage in the body opening out of the side thereof having said edge portion but spaced from said edge portion, said body being a surface of revolution, wedging means in said passage for engaging the tool, said passage being located and said wedging means being constructed so that wedging force tends to move the body about its axis to force the edge against a tool whereby the device engages a tool at two spaced positions.

13. In a tool holder having an aperture for a tool, said holder having a cavity for a locking device intersecting said aperture, said cavity being cylindrical, a cylindrical body in said cavity having a flat side corresponding to the line of intersection of the cavity with the aperture, a transverse passage in the body opening out of said flat side, an inclined lip swaged from the flat side into the opening of said passage to slightly reduce the width thereof, a ball in said passage slightly greater in diameter than the width of the opening in line with said lip, a longitudinal threaded passage in said body intersecting the transverse passage, a screw threaded in said longitudinal passage having a conical tip engaging said ball to wedge it out through the opening in said flat side, said threaded passage being slightly larger in diameter than said ball whereby said ball may be removed from the body through said longitudinal passage, said passages being arranged so that the line of action of the force applied by said conical end to the ball is always on the side of center of the ball remote from said flat side.

14. The invention set forth in claim 13 wherein said line of action always makes an angle with a radius to the point of tangency of the ball and passage of at least 8°.

15. The invention set forth in claim 14 wherein said transverse passage is on an angle of about 15° with respect to said flat side and makes an angle greater than 90° with said longitudinal passage.

16. The invention set forth in claim 15 wherein said longitudinal passage is offset from the axis of said body in a direction away from said flat side and both said passages are offset away from the axis of said passage in a direction parallel to said flat side and located on the side of the center of the body which is opposite to the hand of the thread in said longitudinal passage.

17. The invention set forth in claim 16 wherein the intersecting bottoms of said passages are conical in shape corresponding to the angle of the tip of a drill bit and the bottom of the longitudinal passage is of sufficient width so that the ball is tangent thereto when in the transverse passage but as far away from the flat side as possible.

References Cited in the file of this patent

UNITED STATES PATENTS

| | | |
|---|---|---|
| 1,635,909 | Tobeler | July 12, 1927 |
| 1,723,824 | Tobeler | Aug. 6, 1929 |
| 2,547,789 | Skeel | Apr. 3, 1951 |
| 2,662,773 | Parsons | Dec. 15, 1953 |